United States Patent
Jonsson et al.

(10) Patent No.: US 11,119,831 B2
(45) Date of Patent: Sep. 14, 2021

(54) SYSTEMS AND METHODS FOR INTERRUPTING LATENCY OPTIMIZED TWO-PHASE SPINLOCK

(71) Applicant: Wind River Systems, Inc., Alameda, CA (US)

(72) Inventors: Kenneth Jonsson, Sollentuna (SE); Markus Carlstedt, Uppsala (SE)

(73) Assignee: Wind River Systems, Inc., Alameda, CA (US)

( * ) Notice: Subject to any disclaimer, the term of this patent is extended or adjusted under 35 U.S.C. 154(b) by 0 days.

(21) Appl. No.: 16/739,445

(22) Filed: Jan. 10, 2020

(65) Prior Publication Data
US 2021/0216378 A1 Jul. 15, 2021

(51) Int. Cl.
  *G06F 9/52* (2006.01)
  *G06F 9/50* (2006.01)
  *G06F 9/48* (2006.01)

(52) U.S. Cl.
  CPC .............. *G06F 9/52* (2013.01); *G06F 9/4887* (2013.01); *G06F 9/505* (2013.01); *G06F 9/5038* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 5,774,731 A * | 6/1998 | Higuchi | .................... | G06F 9/52 710/200 |
| 5,790,851 A * | 8/1998 | Frank | ......................... | G06F 9/52 718/100 |
| 6,480,918 B1 * | 11/2002 | McKenney | ............. | G06F 9/526 710/200 |
| 9,697,055 B2 * | 7/2017 | Greco | .................... | G06F 9/4843 |
| 9,772,888 B2 * | 9/2017 | Richardson | ............. | G06F 9/526 |
| 2003/0058878 A1 * | 3/2003 | Minnick | ................. | H04L 47/41 370/412 |
| 2003/0149820 A1 * | 8/2003 | Kolinummi | ............. | G06F 9/526 710/200 |
| 2011/0185154 A1 * | 7/2011 | Stellwag | ................. | G06F 9/524 712/30 |
| 2014/0108728 A1 * | 4/2014 | Nguyen | .............. | G06F 12/0831 711/118 |
| 2017/0242736 A1 * | 8/2017 | Srivastava | .............. | G06F 9/526 |
| 2017/0344403 A1 * | 11/2017 | Stults | ....................... | G06F 9/524 |
| 2019/0332446 A1 * | 10/2019 | Nilsen | ................. | G06F 9/30101 |
| 2019/0370068 A1 * | 12/2019 | Leyrer | .................. | H04L 1/0041 |
| 2020/0264886 A1 * | 8/2020 | Roy | ....................... | G06F 9/3836 |

* cited by examiner

*Primary Examiner* — Raymond N Phan
(74) *Attorney, Agent, or Firm* — Fay Kaplun & Marcin, LLP

(57) ABSTRACT

Described is a two-phase spinlock that controls access to a resource from a plurality of threads. The two-phase spinlock receives requests from threads to acquire the resource, places the threads in a first queue associated with a first phase of the two-phase spinlock, determines whether at least one of a predetermined number of slots in a second phase of the two-phase spinlock is available and when the slots are unavailable, processes an interrupt served by a select one of the threads based on a number of attempts by the selected thread to enter the second phase.

18 Claims, 3 Drawing Sheets

SYSTEMS AND METHODS FOR INTERRUPTING LATENCY OPTIMIZED TWO-PHASE SPINLOCK

BACKGROUND INFORMATION

A lock is a computing mechanism that controls access to a computing resource. For example, the lock may enforce a limit on access to the resource where a plurality of different threads are attempting to access the resource. A particular type of lock is a spinlock which enables a requesting thread that is waiting for access to an occupied resource to wait in a loop while repeatedly checking if the spinlock to the resource is available. There are two main classes of spinlocks: task-spinlocks and Interrupt Service Routine (ISR)-spinlocks. While in the loop for task-spinlocks, the requesting thread may still be active and perform other tasks. However, ISR-spinlocks do not allow the requesting thread to perform other tasks.

A spinlock may incorporate delays and inefficiencies. For example, the resource may be assigned and locked to a requesting thread that is not actively utilizing the resource. In such a scenario, the resource may remain inaccessible for an extended period of time because the thread does not release the spinlock.

A computing environment may be configured deterministically that causes threads to be processed efficiently. However, to be configured in this manner may require that interrupts be disabled. Due to how interrupts indicate an immediate need for attention and the relatively unsystematic nature of interrupts, the environment may select to eliminate or prevent a use of the interrupts when queuing, acquiring, and releasing a spinlock.

To provide a specific example, a traditional ISR-spinlock must spin with interrupts disabled on the local CPU-core that want to acquire the lock. Any interrupt routed to that CPU-core may have to pend for a long (and potentially non-deterministic) period. Spinning with local interrupts enabled in a traditional ISR-spinlock implementation is prone to dead-lock.

SUMMARY

The exemplary embodiments include a method performed by a two-phase spinlock that controls access to a resource from a plurality of threads. The method includes receiving requests from threads to acquire the resource, placing the threads in a first queue associated with a first phase of the two-phase spinlock, determining whether at least one of a predetermined number of slots in a second phase of the two-phase spinlock is available and when the slots are unavailable, processing an interrupt served by a select one of the threads based on a number of attempts by the selected thread to enter the second phase.

Further exemplary embodiments include a method performed by a two-phase spinlock that controls access to a resource from a plurality of threads, the two-phase spinlock including a first phase including a plurality of first threads. The method includes determining whether a lock to access the resource is available, when the lock is available, selecting from a plurality of second threads in a second phase of the two-phase spinlock to acquire the lock, determining an age of the selected second thread, when the age is not the oldest among the second threads in the second phase, preventing any of the first threads from entering the second phase and when the age is the oldest among the second threads in the second phase, selecting an oldest first thread among the first threads to enter the second phase.

Additional exemplary embodiments are directed to a method performed by a two-phase spinlock that controls access to a resource from a plurality of threads. The method includes receiving requests from threads to acquire the resource, placing the threads in a first queue as first threads associated with a first phase of the two-phase spinlock, determining whether at least one of a predetermined number of slots in a second phase of the two-phase spinlock is available, when the slots are unavailable, processing an interrupt served by one of the first threads based on a number of attempts by the one of the first threads to enter the second phase, when the at least one of the slots is available, selecting one of the first threads to enter the second phase, determining whether a lock to access the resource is available, when the lock is available, selecting from a plurality of second threads in the second phase to acquire the lock, determining an age of the selected second thread, when the age is not the oldest among the second threads in the second phase, preventing any of the first threads from entering the second phase and when the age is the oldest among the second threads in the second phase, selecting an oldest first thread among the first threads to enter the second phase.

DETAILED DESCRIPTION

Figure 1:
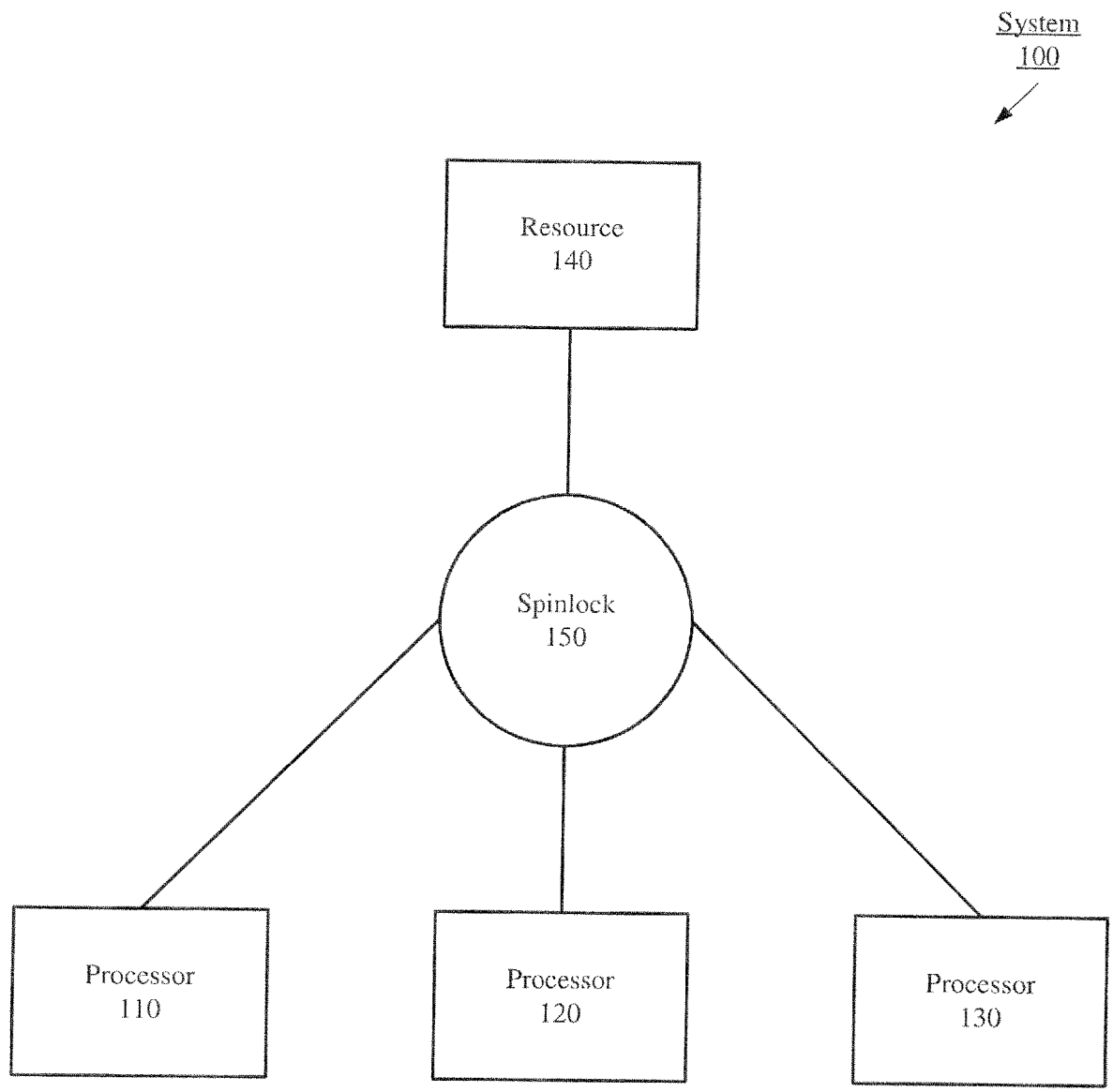
FIG. 1 shows an exemplary system including a two-phase spinlock according to the exemplary embodiments.

The exemplary embodiments may be further understood with reference to the following description and the related appended drawings, wherein like elements are provided with the same reference numerals. The exemplary embodiments are related to a device, a system, and a method for implementing a spinlock mechanism with a starvation protection feature that creates a deterministic spinlock while allowing waiting threads to serve interrupts while pending a lock acquisition. The spinlock according to the exemplary embodiments may be considered to be a two-phase spinlock. The spinlock may assign tickets to requesting threads for a resource to place them in the first phase. While in the first phase, the threads may still serve interrupts. When promoted to the second phase, the spinlock may assign the resource to threads based on a competition for the resource. The two-phase spinlock may utilize various features to maintain a deterministic approach while still affording an opportunity to serve interrupts. As will be described in greater detail below, the exemplary embodiments allow processing of interrupts while waiting without the risk of dead-lock when the lock is eventually successfully acquired.

In software development, a "lock" is a mechanism for enforcing limits on access to a resource in an environment where there are multiple concurrent threads of execution. The lock may be advisory, where each executing thread acquires the lock before accessing the corresponding data, or may be mandatory, where an attempt to make unauthorized access to a locked resource will force an exception. The software lock may implement a shared mode, where several threads may simultaneously access a shared lock for read-only data access.

In addition to the above categories, a lock may be categorized with respect to when a lock prevents the progress of a thread. For example, in one approach, the lock may be designed to block execution of a thread requesting access to a locked resource until the thread is allowed to access the resource. In contrast, a "spinlock" is a lock in which the thread simply waits (or "spins") until the locked resource becomes available. Once acquired, a spinlock may be held until explicitly released. In other implementations, the spinlock may be automatically released if the thread blocks.

A spinlock may be used efficiently when threads are likely to be prevented from accessing locked resources for a short period of time. The short duration threads avoid the processing overhead that results from rescheduling processes. Thus, a spinlock may be used to control access to resources within operating system kernels. However, the lock may also remain in place for a longer duration of time. In such a scenario, the use of the spinlock may be wasteful as other threads are prevented from running (e.g., acquiring the resource) and require rescheduling. When this happens, other threads that are attempting to access the resource may continue spinning (e.g., trying to obtain access to the locked resource) even though there is no progress being made towards releasing the resource.

The system may also incorporate the spinlock to acquire and release the resource by threads in a deterministic manner. The processing of threads by the spinlock for spinning threads to acquire a resource and subsequently release the resource may be performed deterministically by eliminating select operations that may interrupt this deterministic approach. For example, the spinlock may prevent or disable threads that are spinning from serving an interrupt. However, those skilled in the art will appreciate the benefits and uses that an interrupt may provide, particularly in a system that shares a resource and assigns the resource to a requesting thread by locking and releasing the resource.

The exemplary embodiments provide a two-phase spinlock controlling access to a resource by a plurality of requesting entities (e.g., processors). The two-phase spinlock may include a first phase providing a first queue in which threads requesting the resource may spin. While in the first phase, the threads may serve interrupts. The two-phase spinlock may include a second phase providing a second queue in which threads requesting the resource compete for the resource. While in the second phase, the threads may be prevented from serving interrupts.

As will be described in detail below, the two-phase spinlock according to the exemplary embodiments is configured to ensure "acquire" memory semantics when the lock is taken by a thread. For example, all load/stores following the lock operation are guaranteed to "happen-after" the acquisition of the lock when viewed from any thread in the system. The unlock operation provides "release" memory semantics. For example, all load/stores preceding the unlock operation are guaranteed to "happen-before" the lock is released when viewed from any thread in the system. Accordingly, the exemplary embodiments maintain the deterministic manner in which the spinlock operates while still affording an opportunity to serve interrupts. As will become apparent below, the acquire/release operation of the two-phase spinlock according to the exemplary embodiments is less strict than full memory fences. However, the acquire/release operation remains sufficient through implementation without incorporating factors that would be required (e.g., "mfence" instructions). The two-phase spinlock according to the exemplary embodiments may also be hardware optimized in select environments of the system utilizing the two-phase spinlock. Therefore, the two-phase spinlock according to the exemplary embodiments may operate in a more efficient and faster manner than conventional spinlocks.

FIG. 1 illustrates an exemplary system 100 including a two-phase spinlock 150 according to the exemplary embodiments. The system 100 may include a plurality of processors 110, 120 and 130 and a resource 140 for which access is controlled by a spinlock 150. The processors 110, 120, 130 may each be individual microprocessors or processing components that are running in parallel. The system 100 including the processors 110, 120, 130 may be part of a single computing device, may be separate microprocessors associated with respective computing devices, may be software processes acting as processors, may be any other similar element capable of executing processes and requesting access to resources, etc. While the term "processor" is used herein to describe the entity that is attempting to gain access to the resource 140, the processors 110, 120, 130 may represent a hardware processor, a software or firmware processing application, execution threads that may request access to the resource 140, etc.

The system 100 may also be implemented in a cloud or with virtual machines. Thus, the description herein with regard to the processors 110, 120, 130 and the resource 140 being embodied in hardware and/or in the components of the system 100 is only for illustrative purposes. When implemented in a cloud or with virtual machines, the functionalities described below for the processors 110, 120, 130 and the resource 140 may be corresponding components within a cloud or virtual machine architecture that one skilled in the art will understand that fall within the scope of the exemplary embodiments.

The system may also include the resource 140. The spinlock 150 may control access to the resource 140. The resource 140 may be any resource that has a limited capacity or other limiting factor that prevents more than a predetermined number of the processors 110, 120, 130 (or requesting entity) from concurrently accessing the resource 140. For example, the resource 140 may be a shared memory space (e.g., a memory arrangement (e.g., a random-access memory, a read only memory, etc.), a peripheral (e.g., a device driver), etc.).

The spinlock 150 may be a two-phase spinlock in which threads may enter a first phase or a second phase of the spinlock 150. For illustrative purposes, as described herein, a "thread" may be used interchangeably with a "processor". In either instance, the thread and the processor according to the exemplary embodiments relate to a requesting entity of the resource 140 where the thread may be understood to be, for example, a CPU-thread that may be a thread of a physical CPU or a logical thread in a CPU-core. The spinlock 150 may operate in accordance with the exemplary method 200 directed to the first phase and the exemplary method 300 directed to the second phase described below and illustrated in FIGS. 2 and 3, respectively. While in the first phase, the threads may enter a spin state pending entry to the second phase. While in the second phase, the threads may remain in the spin state while competing for the resource 140 until acquiring the resource 140.

According to the exemplary embodiments, the lock process is split into two-phases. In the first phase, the spinlock 150 performs an atomic fetch-and-add operation on a "ticket" counter for each thread requesting the resource 140.

The ticketing operation may be performed utilizing any mechanism as one skilled in the art will understand. While in the first phase, the threads that are spinning may continue to serve interrupts when applicable. In the first phase, the spinlock 150 may not implement a maximum number of threads that remain spinning in the first phase. In the second phase, the spinlock 150 performs an acquire-and-release operation for threads that are spinning in the second phase. In the second phase, the spinlock 150 may implement a maximum number of threads that remain spinning in the second phase.

The spinlock 150 according to the exemplary embodiments may guarantee that a thread has a maximum bounded wait time until acquisition of the resource 140. For example, according to the exemplary embodiments, a thread having a ticket N may be served no later than after N+D+W threads have been granted the lock. W may be the number of threads spinning in phase one with a ticket number less than N. W may be a dynamic component that depends on how contended the lock is where W may not exceed the number of threads in the system 100 minus one. D may be the maximum number of times a pending CPU-thread may drop a ticket in phase one. The ticket should be dropped before local interrupts can be enabled. Any pending interrupts will be served as soon as the local interrupt is enabled. Therefore, through the mechanism performed by the spinlock 150, the exemplary embodiments may ensure that there is an upper limit to how many times a certain thread that is spinning has to wait until being granted the lock.

Figure 2:
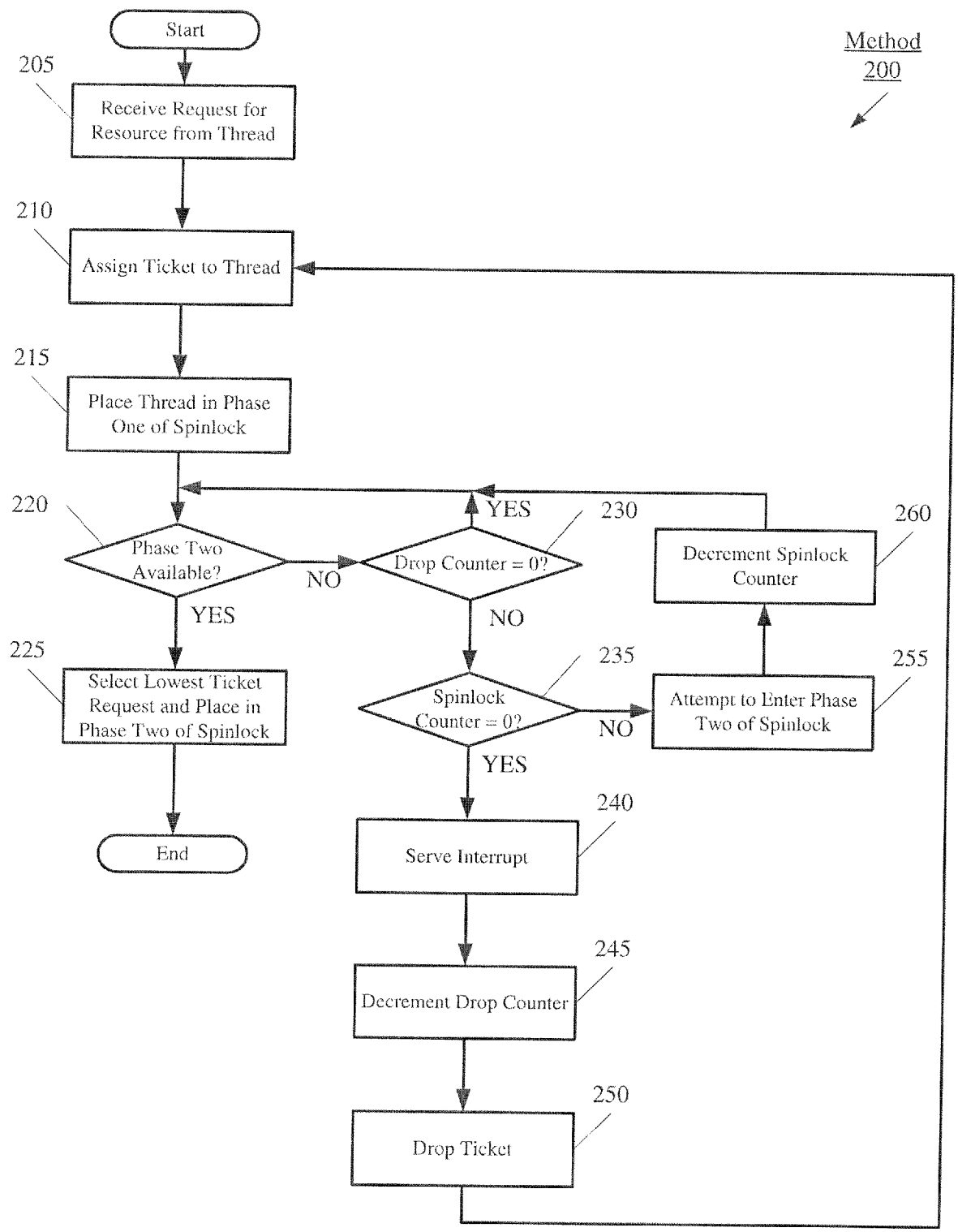
FIG. 2 shows an exemplary method for implementing a first phase of a two-phase spinlock according to the exemplary embodiments.

FIG. 2 shows an exemplary method 200 for implementing a first phase of the two-phase spinlock 150 according to the exemplary embodiments. The method 200 relates to operations performed by the spinlock 150 for threads requesting access to the resource 140 and for threads spinning in the first phase. The method 200 will be described with regard to the system 100 of FIG. 1 where the requesting entity for the resource 140 is one of the processors 110, 120, 130 or a thread executed by one of the processors 110, 120, 130.

The exemplary method 200 and the exemplary method 300 (to be described below) are described from the perspective of the spinlock 150 performing the various operations. However, those skilled in the art will understand that the spinlock 150 may represent a collaboration of operations performed by different hardware, software, and/or firmware components. For example, the spinlock 150 may be a feature provided through an operating system. The operating system may include an interrupt handler that processes interrupts. Accordingly, the spinlock 150 being described as processing an interrupt that is served by a thread does not necessitate that a specific spinlock component is responsible for such an operation. Instead, the spinlock 150 is representative of a combination of operations that may be performed by one or more components (e.g., embodied in hardware or software) to achieve the features provided by using a spinlock or comparable locking mechanism.

Threads spinning in phase one may serve an interrupt while waiting to enter phase two. As will become apparent below, the serving of interrupts does not interrupt the deterministic manner of utilizing the spinlock 150. For example, a thread with ticket N does not block a thread with ticket N+1, which would be the result in a pure ticket based conventional spinlock implementation. A thread with ticket number N may be next to enter phase two assuming N is the oldest ticket (e.g., lowest number ticket issued by the spinlock 150) when the thread having at least the ticket number N-A has been served in phase two. In this manner, the ticket may identify an age which may correspond to a number of the ticket (e.g., a ticket with the highest age has a lowest ticket number and a ticket with a lowest age has a highest ticket number).

In 205, the spinlock 150 receives a request for the resource 140 from a thread. For example, a thread from one of the processors 110, 120, 130 may request use of the resource 140. In 210, the spinlock 150 may assign a ticket to the thread. The spinlock 150 may utilize any ticket-based spinlock to process the request and assign the ticket. In 215, the spinlock 150 may place the thread in phase one. For example, the thread may be spinning in phase one, awaiting access to the resource 140.

In 220, the spinlock 150 determines whether phase two is available. Phase two of the spinlock 150 may have variable "A" that is the maximum number of slots that are available to be filled by threads that are spinning. The spinlock 150 may therefore identify when a slot is open (e.g., a flag is set). For example, the resource 140 may have become available such that a thread in phase two acquires the resource 140. When this occurs, the thread that acquired the resource 140 is no longer spinning and exits phase two where the slot that was occupied is now free.

If a slot in phase two is available, the spinlock 150 continues to 225. In 225, the spinlock 150 selects a thread among the threads spinning in phase one that has an oldest ticket. For example, tickets may be assigned to each thread requesting the resource 140 based on chronological order (e.g., starting with ticket 1 and progressing to ticket N). Using this ticket assignment scheme, a ticket with the lowest number may be selected. The spinlock 150 may place the selected thread in phase two.

Returning to 220, if a slot in phase two is unavailable, the spinlock 150 continues to 230. In 230, the spinlock 150 determines whether a spinning thread in phase one still has an opportunity to serve an interrupt. In making this determination, the spinlock 150 may utilize a drop counter. The drop counter may track a number of times that a set of attempts to enter phase two have been performed. The drop counter may limit a duration in which a spinning thread in phase one may serve an interrupt. As described above, the maximum number of drops that a CPU-thread can do is limited to "D" drops. As also described above, the spinlock 150 according to the exemplary embodiments enables spinning threads in phase one to serve interrupts. However, a continued use of interrupts may cause a particular thread to remain in phase one indefinitely without entering phase two because each time an interrupt is served, the thread may drop the ticket and lose its place in the queue of the first phase. When the thread drops the ticket and re-enters the first phase, the spinlock 150 may re-assign a new ticket having a newest number (e.g., highest number).

When the drop counter has expired or has been exhausted with no further opportunities to serve an interrupt, the spinlock 150 returns the thread to 220 where the thread continues to spin in the position indicated by the ticket. When the drop counter indicates further opportunities to serve an interrupt, the spinlock 150 continues to 235.

In 235, the spinlock 150 determines whether a spinning thread in phase one still has an opportunity to attempt to enter phase two. Under conventional spinlock mechanisms, the spinlock 150 may attempt to acquire the resource 140. In a substantially similar manner, the spinning thread in phase one may attempt to enter phase two independently of the ticket. As described above, the drop counter may track a set of attempts performed by a spinning thread in phase one to enter phase two. Each spinning thread in phase one may further utilize a spinlock counter that tracks a number of times that the spinning thread in phase one attempts to enter phase two. However, under the mechanism with which the spinlock 150 shifts spinning threads from phase one to phase two, the spinning thread in phase one may remain in phase one. Thus, when the spinlock counter indicates that further opportunities to attempt to enter phase two are available, the spinlock 150 continues to 255 where the thread is allowed to attempt to enter phase two. Assuming the thread remains in phase one, in 260, the spinlock 150 decrements the spinlock counter for the given thread.

Returning to 235, when the spinlock counter indicates no further opportunities to attempt to enter phase two by the spinning thread in phase one, the spinlock 150 continues to 240. In 240, the spinlock 150 determines that an instance of the drop counter has occurred where an entire set of attempts to enter phase two has been exhausted by the thread. Accordingly, the spinlock 150 allows the thread to serve an interrupt. In 245, when the interrupt is served, the spinlock 150 decrements the drop counter. In 250, when the interrupt is served, the spinlock 150 drops the ticket for the thread. The spinlock 150 returns to 210 such that the thread is assigned a new ticket (e.g., a newest number).

Figure 3:
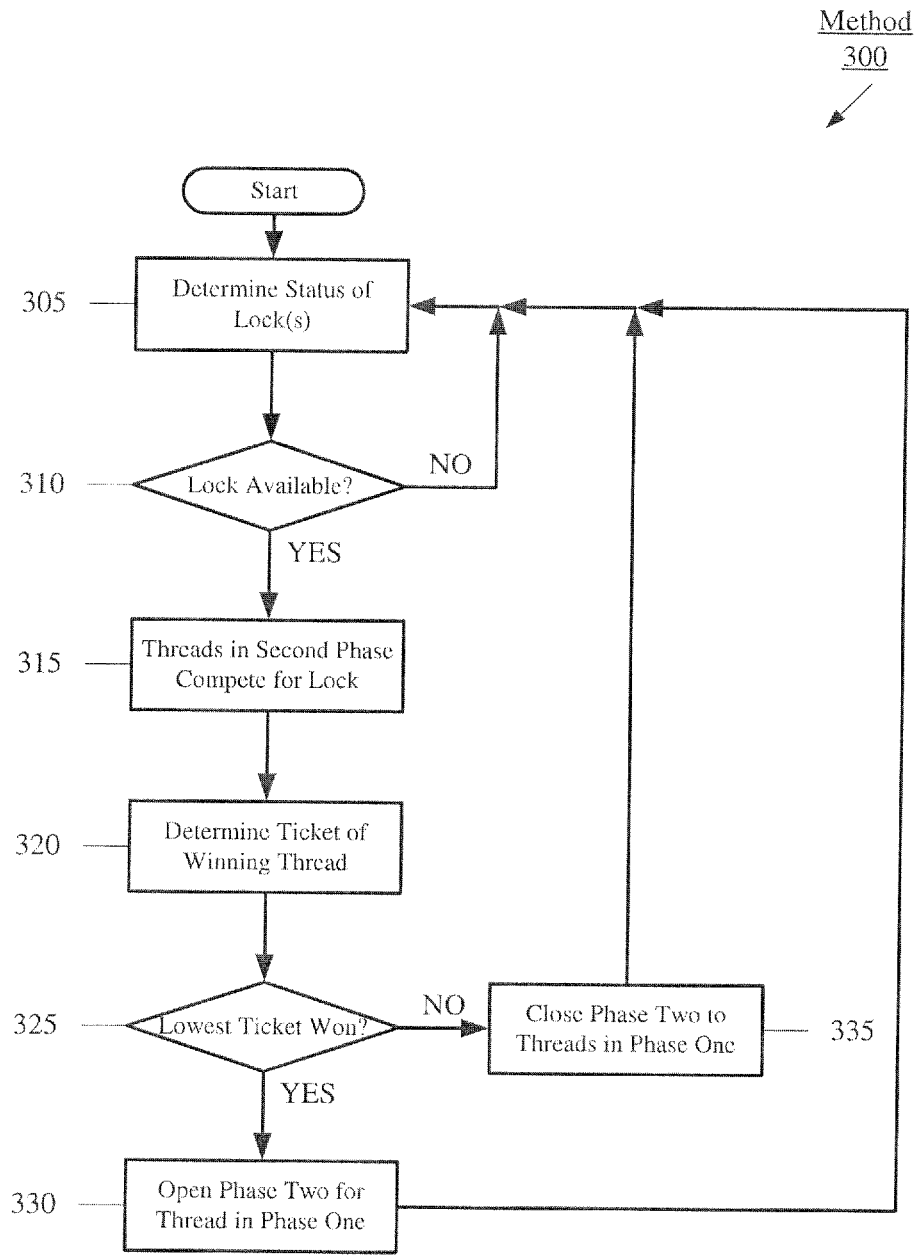
FIG. 3 shows an exemplary method for implementing a second phase of a two-phase spinlock according to the exemplary embodiments.

FIG. 3 shows an exemplary method 300 for implementing a second phase of the two-phase spinlock 150 according to the exemplary embodiments. The method 300 relates to operations performed by the spinlock 150 for spinning in the second phase. The method 300 will be described with regard to the system 100 of FIG. 1 where the requesting entity for the resource 140 is one of the processors 110, 120, 130 or a thread executed by one of the processors 110, 120, 130. The method 300 is described from the perspective of the spinlock 150. However, again, the spinlock 150 may only be representative of a combination of operations performed by one or more components.

In the second phase, the spinlock 150 may limit the number of threads that may be in this phase. Thus, there may not be any more than A threads that are spinning in phase two. The set of threads in the second phase may spin on the lock to become available and then compete for the lock via an atomic test-and-set operation on the locked atomic flag. Therefore, the lock is not necessarily acquired by the threads in strict ticket order since any of the threads in phase two may "win" the atomic test-and-set to acquire the lock. The test-and-set operation may be performed with acquire memory semantics and the same variable may be stored in using release semantics in the unlock path so that proper memory consistency semantics for the lock is implemented. All other atomic operations in the lock/unlock path may use "relaxed" atomics (e.g., atomic operations with no synchronization with respect to any other load/store), which may be significantly faster.

As described above, the threads in phase two may be prevented from serving interrupts. However, this implementation is only illustrative. In another exemplary implementation, the threads spinning in phase two may also be allowed to serve interrupts. Though the threads may be allowed to serve interrupts, the exemplary embodiments may select disabling interrupts. For example, if there is only a single waiting thread in the second phase and if that thread owns the oldest ticket not served so far, this scenario may prevent any more threads to advance from phase one to phase two until the thread with the oldest ticket releases the lock. Thus, the method 300 is described based on the implementation where threads in the second phase are prevented from serving interrupts.

In 305, the spinlock 150 determines a status of the locks for the resource 140. For example, in controlling the access to the resource 140, the spinlock 150 may allow a predetermined number of threads to access the resource (e.g., only one thread at a time, two or more threads concurrently, etc.). Typically, a spinlock is a mutually exclusion mechanism allowing only allow a single thread that may write to the resource to acquire the lock. However, in some exemplary embodiments it may be possible to separate readers from writers, where there is only a single writer but multiple readers. In determining the status, the spinlock 150 may check a flag of the resource 140 that indicates an availability for the resource 140 to be acquired. In 310, the spinlock 150 determines if a lock of the resource 140 is available. For example, when the system 100 has been activated and the resource 140 is not fully locked or a thread has recently released the lock of the resource 140 where either scenario results in the flag of the lock for the resource 140 being set to available, the lock may be available. In another example, each lock of the resource 140 may be occupied by a thread such that there is no lock available. If no lock is available, the spinlock 150 returns to 305 to continue monitoring the status of the locks of the resource 140.

If a lock of the resource is available, the spinlock 150 continues to 315. In 315, the atomic test-and-set operation may be performed where each spinning thread in the second phase competes for the available lock to acquire the resource 140. The atomic test-and-set operation is utilized only for illustrative purposes as any competition-based operation to acquire the resource 140 may be used within the scope of the exemplary embodiments.

In 320, the spinlock 150 determines the ticket of the winning thread that has exited the second phase and acquired the lock of the resource 140. As described above, the exemplary embodiments may guarantee an upper waiting limit that a thread must wait in the first phase and the second phase before the thread is processed (e.g., acquire the resource 140). In one operation that performs this guarantee, the spinlock 150 may prevent further threads from entering the second phase when certain conditions apply. In 325, the spinlock 150 may determine a condition as whether the ticket of the winning thread is an oldest ticket (e.g., a lowest number ticket). In the instance that the thread that won the lock is the oldest ticket, the spinlock 150 continues to 330 where the spinlock 150 opens phase two to the threads spinning in phase one. As described above in 225 of the method 200, the thread spinning in the first phase having the oldest ticket is selected for placement in phase two. Subsequently, the spinlock 150 may return to 305 to repeat the method 300 with a newly introduced thread in phase two. In the instance that the thread that won the lock is not the oldest, the spinlock 150 continues to 335 where the spinlock 150 closes phase two to the threads in phase one. Subsequently, the spinlock 150 returns to 305 to repeat the method 300 with only the remaining threads spinning in phase two.

In an exemplary scenario of executing the method 300, the spinlock 150 may allow up to three threads to spin in phase two while only one lock is available for the resource 140. The threads in phase two may include threads A, B, and C, listed from oldest to newest ticket while thread D is the oldest ticket in phase one. In a first example, in 320, thread A may win the lock. When the lock is released by thread A, the spinlock 150 may determine that thread A is the oldest ticket which allows a thread in phase one to enter phase two. Thus, thread D may transition from phase one to phase two. The threads in phase two may now be threads B, C, and D.

In a second example, in 320, thread B may win the lock. When the lock is released by thread B, the spinlock 150 may determine that thread B is not the oldest ticket since thread A is still in phase two. Thus, the spinlock 150 may prevent a new thread from phase one entering phase two. In the next competition, threads A and C may compete for the lock. If thread A should win, the operations performed in the first example may be used. Thus, when the lock is released by thread A, the spinlock 150 may allow threads in phase one to enter phase two. In this instance, threads D and E may transition from phase one to phase two as there are two slots available in phase two. The threads in phase two may now be threads C, D, and E. However, after thread B releases the lock and if thread C should win, the operations performed in the second example may be repeated. Thus, in returning to 320 after thread C has released the lock, the only remaining thread is thread A. With no other competition, thread A is guaranteed to win the lock for the resource. As thread A is the oldest, after releasing the lock by thread A, all three slots become open to threads in phase one. Thus, the threads in phase two may now be threads D, E, and F.

The exemplary embodiments may be performed with various timing conditions. For example, the transition from phase one to phase two may be performed after the thread in phase two that won has acquired the lock. In another example, the transition from phase one to phase two may be performed after the thread in phase two that won and has acquired the lock has now released the lock.

With regard to the release operation, the spinlock 150 may grant access to the resource 140 for any duration that the requesting thread requires the resource 140. However, once the lock for the resource has been released, the spinlock 150 may change the flag for the lock to indicate an availability. According to another exemplary implementation, the spinlock 150 may utilize bits and bit arrays to perform a variety of operations based on the conditions. For example, in an uncontended case, the spinlock 150 may atomically clear the locked atomic flag with release memory ordering and then re-enable interrupts. In another example, the spinlock may update the oldest ticket variable of the threads in phase one and phase two. In this example, there may be a plurality of cases to consider with corresponding operations to be performed before clearing the lock. If the current thread does not have the oldest non-served ticket, before clearing the lock, the spinlock 150 may calculate the difference between the ticket number for this thread and the oldest ticket to set a bit to be substantially less than the difference in a variable of at least A bits in width stored in the lock. If the current thread does have the oldest served ticket, the spinlock 150 may set a bit zero of a ticket mask and increment the oldest ticket by the number of consecutive low order bits set in ticket mask. The ticket mask is a general concept where a mask is kept where bit N is set if a ticket is the "oldest served ticket"+N has already been served. The content of ticket mask may be right shifted so all consecutive low order set bits are removed. As previously described, additional threads are allowed into phase two when the "oldest served ticket" releases the lock. The amount of threads that are allowed into phase two depends on the number of consecutive bits set in the ticket mask counting from "oldest served ticket"+zero bit. For example, if bit 0 (which corresponds to "oldest served ticket") and bit 1 is set, but bit 2 is cleared, then two more threads may enter phase two (the mask is shifted right the same amount). By performing a release operation in this manner, the spinlock 150 may ensure that no thread has to wait indefinitely as the thread with the oldest ticket that always loses the test-and-set for the lock ultimately wins after maximum A-1 attempts as this thread is the only remaining thread. One skilled in the art will appreciate that access to the oldest ticket variable and the ticketMask may not utilize atomic operations as these variables are already protected by the spinlock 150.

The exemplary embodiments provide a device, system, and method to implement a two-phase spinlock that is utilized in a deterministic manner while enabling interrupts to be served while also providing starvation protection. Phase one of the two-phase spinlock that controls access to a resource may process requests for the resource using a ticket mechanism that chronologically orders requests as they are received. Threads that are in the first phase may serve interrupts, particularly based on a drop counter that tracks sets of attempts to enter phase two of the two-phase spinlock and a spinlock counter that tracks each attempt to enter phase two. Phase two of the two-phase spinlock may perform an acquire and release operation for a predetermined maximum number of threads that are allowed to be in phase two. The spinlock may ensure that new threads may only enter phase two from phase one when an oldest ticket thread has acquired the lock to the resource.

Those skilled in the art will understand that the above-described exemplary embodiments may be implemented in any suitable software or hardware configuration or combination thereof. An exemplary hardware platform for implementing the exemplary embodiments may include, for example, Intel x86, ARM, PowerPC, RISC-V based platforms with compatible operating system, a Windows platform, a Mac platform and MAC OS, a mobile device having an operating system such as iCS, Android, etc. In a further example, the exemplary embodiments of the above described method may be embodied as a program containing lines of code stored on a non-transitory computer readable storage medium that may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
 at a two-phase spinlock that controls access to a resource from a plurality of threads:
 receiving requests from threads to acquire the resource;
 placing the threads in a first queue associated with a first phase of the two-phase spinlock, wherein the placing the threads in the first queue is based on an atomic fetch-and-add operation;
 determining whether at least one of a predetermined number of slots in a second phase of the two-phase spinlock is available; and
 when the slots are unavailable, processing an interrupt served by a select one of the threads based on a number of attempts by the selected thread to enter the second phase.

2. The method of claim 1, wherein the fetch-and-add operation comprises: assigning a respective ticket to each of the threads based on a chronological priority order.

3. The method of claim 1, further comprising:
 determining whether a first counter tracking a first number corresponding to a set of attempts to enter the second phase by a select one of the threads has been exhausted.

4. The method of claim 2, further comprising:
when the at least one of the predetermined number of slots is available, selecting one of the threads in the first queue to enter the second phase based on the chronological priority order.

5. The method of claim 3, further comprising:
when the first counter has been exhausted, preventing the interrupt from being served and remaining in the first queue.

6. The method of claim 3, further comprising:
when the first counter indicates at least one first opportunity for the set of attempts, determining whether a second counter tracking a second number corresponding to each attempt to enter the second phase by the select thread.

7. The method of claim 6, further comprising:
when the second counter indicates at least one second opportunity for the attempts, decrementing the second counter after the select thread performs the attempt.

8. The method of claim 6, further comprising:
when the second counter has been exhausted, receiving the interrupt served by the selected thread; and
decrementing the first counter.

9. The method of claim 8, further comprising:
receiving a further request from the selected thread; and
placing the selected thread in the first queue.

10. A method, comprising:
at a two-phase spinlock that controls access to a resource from a plurality of threads, the two-phase spinlock including a first phase including a plurality of first threads:
determining whether a lock to access the resource is available;
when the lock is available, selecting from a plurality of second threads in a second phase of the two-phase spinlock to acquire the lock;
determining an age of the selected second thread;
when the age is not the oldest among the second threads in the second phase, preventing any of the first threads from entering the second phase; and
when the age is the oldest among the second threads in the second phase, selecting an oldest first thread among the first threads to enter the second phase.

11. The method of claim 10, wherein the determining whether the lock is available is based on a flag being set that indicates an availability of the lock.

12. The method of claim 10, further comprising:
when the age is not the oldest among the second threads in the second phase and when the lock is available after the selected second thread releases the lock, selecting from the remaining second threads in the second phase to acquire the lock.

13. The method of claim 10, wherein the selected second thread acquiring the lock is based on an atomic test-and-set operation in which the second threads compete for the lock.

14. The method of claim 10, wherein the second threads are prevented from serving an interrupt.

15. A method, comprising:
at a two-phase spinlock that controls access to a resource from a plurality of threads:
receiving requests from threads to acquire the resource;
placing the threads in a first queue as first threads associated with a first phase of the two-phase spinlock;
determining whether at least one of a predetermined number of slots in a second phase of the two-phase spinlock is available;
when the slots are unavailable, processing an interrupt served by one of the first threads associated with the first phase based on a number of attempts by the one of the first threads to enter the second phase;
when the at least one of the slots is available, selecting one of the first threads to enter the second phase;
determining whether a lock to access the resource is available;
when the lock is available, selecting from a plurality of second threads in the second phase to acquire the lock;
determining an age of the selected second thread;
when the age is not the oldest among the second threads in the second phase, preventing any of the first threads from entering the second phase; and
when the age is the oldest among the second threads in the second phase, selecting an oldest first thread among the first threads to enter the second phase.

16. The method of claim 15, wherein the selected first thread enters the second phase after the selected second thread has acquired the lock.

17. The method of claim 15, wherein each of the threads are served within a maximum time duration.

18. The method of claim 15, wherein the maximum time duration is based on a chronological entry of one of the threads in the first queue, a maximum number of second threads configured to be in the second phase, and a number of the threads having a lower chronological entry.

* * * * *